United States Patent
Zhao

(10) Patent No.: US 9,588,561 B2
(45) Date of Patent: Mar. 7, 2017

(54) COMMUNICATION MODULE AND TERMINAL FOR IMPLEMENTING HOT PLUG

(71) Applicant: HUIZHOU TCL MOBILE COMMUNICATION CO., LTD., Huizhou (CN)

(72) Inventor: Shiqing Zhao, Huizhou (CN)

(73) Assignee: HUIZHOU TCL MOBILE COMMUNICATIONS CO., LTD., Hui Zhou (CN)

(*) Notice: Subject to any disclaimer, the term of this patent is extended or adjusted under 35 U.S.C. 154(b) by 184 days.

(21) Appl. No.: 14/419,062

(22) PCT Filed: Aug. 9, 2013

(86) PCT No.: PCT/CN2013/081134
§ 371 (c)(1),
(2) Date: Feb. 3, 2015

(87) PCT Pub. No.: WO2014/205890
PCT Pub. Date: Dec. 31, 2014

(65) Prior Publication Data
US 2015/0205337 A1    Jul. 23, 2015

(30) Foreign Application Priority Data

Jun. 26, 2013 (CN) .......................... 2013 1 0257589

(51) Int. Cl.
*G06F 13/40* (2006.01)
*G06F 1/26* (2006.01)
*G06F 1/32* (2006.01)

(52) U.S. Cl.
CPC .......... *G06F 1/266* (2013.01); *G06F 13/4068* (2013.01); *G06F 1/32* (2013.01)

(58) Field of Classification Search
CPC ........ G06F 1/26; G06F 13/40; G06F 12/0246; G06F 1/32
See application file for complete search history.

(56) References Cited

U.S. PATENT DOCUMENTS 5,210,855 A * 5/1993 Bartol ................. G06F 13/4081
710/107
5,898,844 A * 4/1999 Thompson .......... G06F 13/4081
361/58

(Continued)

FOREIGN PATENT DOCUMENTS

CN    101192053 A    6/2008
CN    201984507 U    9/2011

*Primary Examiner* — Henry Tsai
*Assistant Examiner* — Christopher a Daley
(74) *Attorney, Agent, or Firm* — Shimokaji IP

(57) ABSTRACT

A communication module and a terminal include a new-generation mini-peripheral component interconnect express (PCIe) interface, a power switch, a charging unit, a delay unit and an ON/OFF control unit. The charging unit, the power switch, the delay unit and the ON/OFF control unit are separately connected to the new-generation mini-PCIe interface. The power switch is connected to the charging unit, and the charging unit is connected to a power source end of the communication module. A universal serial bus (USB) data pin is shorter than a power source pin. Thereby, the communication module and the terminal have stability and reliability.

18 Claims, 3 Drawing Sheets

(56) References Cited

U.S. PATENT DOCUMENTS

| | | | |
|---|---|---|---|
| 7,448,917 B2* | 11/2008 | Liao | H01R 24/62 |
| | | | 439/660 |
| 9,407,087 B2* | 8/2016 | Tsai | H02H 9/004 |
| 2004/0177202 A1* | 9/2004 | Won | G06F 13/4081 |
| | | | 710/302 |
| 2006/0000917 A1* | 1/2006 | Kim | G06K 19/07733 |
| | | | 235/492 |
| 2013/0164992 A1* | 6/2013 | Hsieh | H01R 24/62 |
| | | | 439/668 |
| 2015/0169491 A1* | 6/2015 | Chen | G06F 13/4068 |
| | | | 710/33 |
| 2015/0222761 A1* | 8/2015 | Zhao | H01H 7/00 |
| | | | 455/572 |

* cited by examiner

COMMUNICATION MODULE AND TERMINAL FOR IMPLEMENTING HOT PLUG

TECHNICAL FIELD

The present disclosure relates to the field of mobile communications technologies, and in particular, to a communication module and a terminal for implementing a hot plug.

BACKGROUND

Currently, common communication modules include third-Generation (3G) modules and fourth-Generation (4G) modules, which mainly use Universal Serial Bus (USB) interfaces (specifically, Mini-PCIe (Peripheral Component Interconnect Express) interfaces), and are plugged into terminals, such as mobile phones and tablet computers, and connected to host systems in the terminals, thereby implementing an Internet connecting function. A hot plugging operation is usually performed when the 3G/4G module is used in a USB interface of the terminal. In other words, a user is allowed to remove or replace the 3G/4G module without shutting down the system or powering off the associated terminal. In this manner, the 3G/4G module can be removed by simple plugging and unplugging actions, and the system continues to run normally without interruption, thereby, improving disaster recovery capability, extensibility and flexibility of the system.

However, existing 3G/4G modules have the following problems during hot plugging:

1. USB interface data is damaged. During design of a Printed Circuit Board (PCB) of a conventional 3G/4G module, all signal pins and data pins have a same length. For example, a USB data pin D+ (Data+, positive data), a USB data pin D− (Data−, negative data) and a power source pin of a USB data interface have the same length. When the 3G/4G module is removed, communication and data of the USB are disconnected at the same time, and at this time, transmission of data may not be completed, and there is not enough time for the host system to store the data, thereby, causing loss of at least a part of the data.

2. A large transient current is generated at a power source interface. When the 3G/4G module is plugged in, a power source voltage output by the host system is immediately input to a power source end of the 3G/4G module, thereby, generating a large transient current. The large transient current may burn out elements in a power source module of the 3G/4G module, causing working disorders and even breakdown of the system.

3. A large transient current is generated when the 3G/4G module is started immediately after being connected to a power source. After the conventional 3G/4G module is plugged in, the host system starts the module immediately. Because the 3G/4G module is started immediately after being powered on, a large transient current is generated, which causes a transient drop in a power source voltage of the host system, thereby, severely affecting stability and reliability of the system.

Therefore, the prior art needs to be modified and improved.

SUMMARY

In view of the defects of the prior art, objectives of the present invention are to provide a communication module and a terminal for implementing a hot plug, so as to solve the problems in the prior art where, during hot plugging of the communication module, data is damaged, and a large transient current is generated, which causes instability of a system.

To achieve the above objectives, the present invention uses the following technical solutions:

A communication module for implementing a hot plug includes a new-generation Mini-PCIe interface configured to be connected to a host system, a power switch configured to control connection and disconnection between a power source end of the communication module and a power supply end of the host system; a charging unit configured to generate a charging current, when the power switch is turned off, to raise a power source voltage of the power source end of the communication module; a delay unit configured to generate a predetermined delay, and to control turning on the power switch according to the predetermined delay; and an ON/OFF control unit configured to control an ON/OFF of the communication module according to a control signal output by the host system after the power switch is turned on, where the charging unit, the power switch, the delay unit and the ON/OFF control unit are separately connected to the new-generation Mini-PCIe interface, wherein the power switch is connected to the charging unit, and wherein the charging unit is connected to the power source end of the communication module; and wherein a length of a data pin of a USB of the new-generation Mini-PCIe interface is shorter than a length of a power source pin of the USB by a predetermined value, the predetermined value is ⅓ of the length of the power source pin, and wherein the communication module is a 3G module.

In another embodiment, a power switch is a field-effect transistor; a source of the field-effect transistor is connected to a twenty-fourth pin of a new-generation Mini-PCIe interface, a first input end of a charging unit and an input end of a delay unit; a gate of the field-effect transistor is connected to an output end of the delay unit, and a drain of the field-effect transistor is connected to a second input end of the charging unit.

In a further embodiment, a charging unit includes a first resistor, a first capacitor, and a second capacitor; a first end of the first resistor is connected to a source of a field-effect transistor, a twenty-fourth pin of a new-generation Mini-PCIe interface and an input end of a delay unit; a second end of the first resistor is connected to a drain of the field-effect transistor, a first end of the first capacitor, a positive electrode of the second capacitor and the power source end of the communication module; and a second end of the first capacitor and a negative electrode of the second capacitor are both grounded.

In yet another embodiment, a resistance of a first resistor is 20Ω, a capacitance of a first capacitor is 100 pF, and a capacitance of a second capacitor is 150 µF.

In yet a further embodiment, a delay unit includes a second resistor and a third capacitor; a first end of the second resistor is connected to a gate of a field-effect transistor; the first end of the second resistor is further connected to a first end of the first resistor and a source of the field-effect transistor through the third capacitor; and a second end of the second resistor is grounded.

In another embodiment, a resistance of a second resistor is 220 KΩ, and a capacitance of a third capacitor is 1 µF.

In a further embodiment, a first time constant determined by a first resistor and a second capacitor is less than a second time constant determined by a second resistor and a third capacitor.

In yet another embodiment, a communication module for implementing a hot plug includes a new-generation Mini-PCIe interface configured to be connected to a host system, and the communication module includes a power switch configured to control connection and disconnection between a power source end of the communication module and a power supply end of the host system; a charging unit configured to generate a charging current, when the power switch is turned off, to raise a power source voltage of the power source end of the communication module; a delay unit configured to generate a predetermined delay, and control turning on the power switch according to the predetermined delay; and an ON/OFF control unit configured to control an ON/OFF of the communication module according to a control signal output by the host system after the power switch is turned on, where the charging unit, the power switch, the delay unit and the ON/OFF control unit are separately connected to the new-generation Mini-PCIe interface, wherein the power switch is connected to the charging unit, and wherein the charging unit is connected to the power source end of the communication module; and wherein a length of a USB data pin of the new-generation Mini-PCIe interface is shorter than a length of a power source pin of the new-generation Mini-PCIe interface.

In yet a further embodiment, a length of a USB data pin is shorter than a length of a power source pin by a predetermined value, and the predetermined value is ⅓ of the length of the power source pin.

In another embodiment, a power switch is a field-effect transistor; a source of the field-effect transistor is connected to a twenty-fourth pin of a new-generation Mini-PCIe interface, a first input end of a charging unit and an input end of a delay unit; a gate of the field-effect transistor is connected to an output end of a delay unit, and a drain of the field-effect transistor is connected to a second input end of the charging unit.

In a further embodiment, a charging unit includes a first resistor, a first capacitor and a second capacitor; a first end of the first resistor is connected to a source of a field-effect transistor, a twenty-fourth pin of a new-generation Mini-PCIe interface and a input end of a delay unit; a second end of the first resistor is connected to a drain of the field-effect transistor, a first end of the first capacitor, a positive electrode of the second capacitor and a power source end of a communication module; a second end of the first capacitor and a negative electrode of the second capacitor are both grounded.

In yet another embodiment, a resistance of a first resistor is 20Ω, a capacitance of a first capacitor is 100 pF, and a capacitance of a second capacitor is 150 μF.

In yet a further embodiment, a delay unit includes a second resistor and a third capacitor; a first end of the second resistor is connected to a gate of a field-effect transistor; a first end of the second resistor is further connected to a first end of the first resistor and a source of the field-effect transistor through the third capacitor; and a second end of the second resistor is grounded.

In another embodiment, a resistance of a second resistor is 220 KΩ, and a capacitance of a third capacitor is 1 μF.

In a further embodiment, a first time constant determined by a first resistor and a second capacitor is less than a second time constant determined by a second resistor and a third capacitor.

In yet another embodiment, a communication module is a 3G module or a 4G module.

In yet a further embodiment, a terminal includes a host system and a communication module for implementing a hot plug, wherein the host system is connected to the communication module and, after a power switch of the communication module is turned on, the host system generates a control signal to control ON/OFF of the communication module; and the communication module includes a new-generation Mini-PCIe interface configured to be connected to the host system; a power switch configured to control connection and disconnection between a power source end of the communication module and a power supply end of the host system; a charging unit configured to generate a charging current, when the power switch is turned off, to raise a power source voltage of the power source end of the communication module; a delay unit configured to generate a predetermined delay, and to control turning on the power switch according to the predetermined delay; and an ON/OFF control unit configured to control an ON/OFF of the communication module according to a control signal output by the host system after the power switch is turned on, wherein the charging unit, the power switch, the delay unit and the ON/OFF control unit are separately connected to the new-generation Mini-PCIe interface, wherein the power switch is connected to the charging unit, and wherein the charging unit is connected to the power source end of the communication module; and wherein a length of a USB data pin of the new-generation Mini-PCIe interface is shorter than a length of a power source pin of the new-generation Mini-PCIe interface.

In another embodiment, a length of a USB data pin is shorter than a length of a power source pin by a predetermined value, and the predetermined value is ⅓ of the length of the power source pin.

In a further embodiment, a power switch is a field-effect transistor; a source of the field-effect transistor is connected to a twenty-fourth pin of a new-generation Mini-PCIe interface, a first input end of a charging unit and an input end of a delay unit; a gate of the field-effect transistor is connected to an output end of the delay unit, and a drain of the field-effect transistor is connected to a second input end of the charging unit.

In yet another embodiment, a charging unit includes a first resistor, a first capacitor and a second capacitor; a first end of the first resistor is connected to a source of a field-effect transistor, a twenty-fourth pin of a new-generation Mini-PCIe interface and a input end of a delay unit; a second end of the first resistor is connected to a drain of the field-effect transistor, a first end of the first capacitor, a positive electrode of the second capacitor and a power source end of a communication module; a second end of the first capacitor and a negative electrode of the second capacitor are both grounded.

In yet a further embodiment, a resistance of a first resistor is 20Ω, a capacitance of a first capacitor is 100 pF, and a capacitance of a second capacitor is 150 μF.

In another embodiment, a delay unit includes a second resistor and a third capacitor; a first end of the second resistor is connected to a gate of a field-effect transistor; the first end of the second resistor is further connected to a first end of the first resistor and a source of the field-effect transistor through the third capacitor; and a second end of the second resistor is grounded.

In a further embodiment, a resistance of a second resistor is 220 KΩ, and a capacitance of a third capacitor is 1 μF.

In yet another embodiment, a first time constant determined by a first resistor and a second capacitor is less than a second time constant determined by a second resistor and a third capacitor.

In yet a further embodiment, a communication module is a 3G module or a 4G module.

Compared with the prior art, a communication module for implementing a hot plug and a terminal, during hot-plugging or hot-unplugging of the communication module, a USB data pin of a new-generation Mini-PCIe interface is shorter than a power source pin of the new-generation Mini-PCIe interface, so that a host system stores USB data in advance of being disconnected from a power supply. Alternatively, or additionally, the host system finishes power-on preparation before USB disconnection or communication, thereby, ensuring integrity and stability of the data. During hot plugging, a charging unit first raises a power source voltage of the communication module, and a power switch is controlled to be turned on after a predetermined delay of a delay unit, thereby, preventing a large transient current, that would otherwise be generated at this time, from damaging electronic elements. At a same time, an ON/OFF control unit controls an ON/OFF of the communication module, according to a control signal output by the host system after the power switch is turned on, to avoid a transient drop in the power source voltage of the host system, that would otherwise be caused by a large transient current, thereby, improving stability and reliability of the system.

DETAILED DESCRIPTION

A communication module and a terminal for implementing a hot plug are provided. In order to make the objectives, technical solutions and effects clearer, the communication modules and terminals are described in detail with reference to the accompany drawings and exemplary embodiments. It should be understood that, the exemplary embodiments are intended for illustrative purposes and are not intended to limit the scope of the appended claims in any way.

Figure 1:
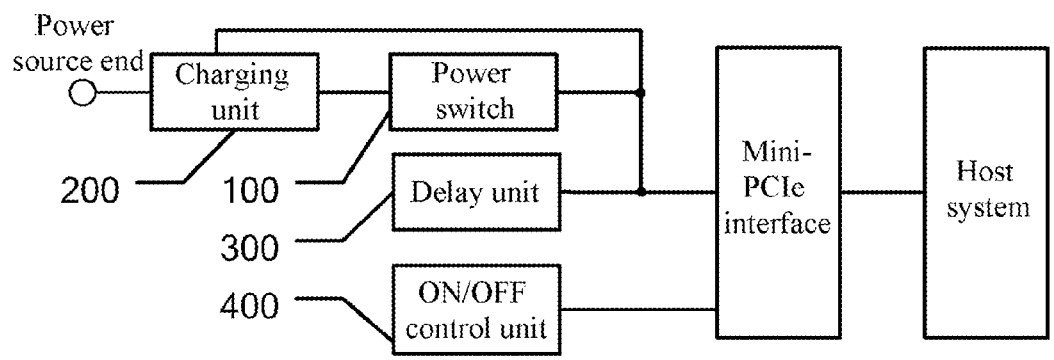
FIG. 1 depicts a schematic structural block diagram of a terminal for implementing a hot plug according to the present invention.

Referring to FIG. 1, a communication module for implementing a hot plug may include a new-generation Mini-PCIe interface (a PCI-E bus-based interface), and the new-generation Mini-PCIe interface may be connected to a host system. The communication module may include a power switch 100, a charging unit 200, a delay unit 300 and an ON/OFF control unit 400. The charging unit 200, the power switch 100, the delay unit 300, and the ON/OFF control unit 400 may be separately connected to the new-generation Mini-PCIe interface. The power switch 100 may be connected to the charging unit 200. The charging unit 200 may be connected to a power source end V_IO of the communication module. The new-generation Mini-PCIe interface may be, for example, a gold-finger interface, which may have characteristics of small contact resistance and anti-oxidation.

The communication module may be, for example, a 3G module or a 4G module. A communication module may include the power switch 100, the charging unit 200, the delay unit 300 and the ON/OFF control unit 400. Other modules in a communication module may be known and, therefore, are not described herein.

Figure 2:
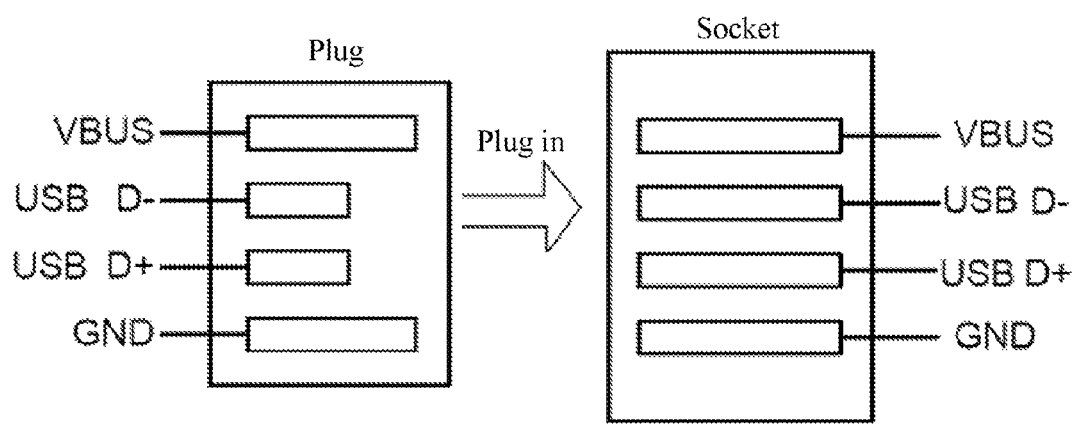
FIG. 2 depicts a schematic diagram of a portion of pins of a communication module for implementing a hot plug and a host system according to the present invention.

A communication module may be connected to the host system by using a new-generation Mini-PCIe interface. In order to avoid data loss or storage failure, when a plug of the communication module is inserted into or removed from a socket of the host system, i.e., during hot plugging or hot unplugging, a length of a USB data pin may be shorter than a length of a power source pin on a PCB of a communication module, such as, for example, when the PCB of the communication module is configured as shown in FIG. 2 and/or FIG. 3. With reference to FIG. 2, a plug may be, for example, a new-generation Mini-PCIe interface of the communication module, and only USB data pins and a power source pin in the plug are shown. An associated socket may be provided within a host system as an interface to the plug of the communication module and, once again, only USB data pins and a power source pin in the interface socket are shown. It can be seen from FIG. 2 that, a USB data pin D− and a USB data pin D+, of the new-generation Mini-PCIe interface of the communication module, may both be shorter than a power source pin $V_{BUS}$, while pins on the socket of the host system may remain unchanged from known sockets. A length of the USB data pin D− and/or the USB data pin D+ of the communication module may be, for example, shorter than a length of the power source pin of the communication module by ⅓, or may be ⅓±0.1 mm of the length of the power source pin.

Figure 3:
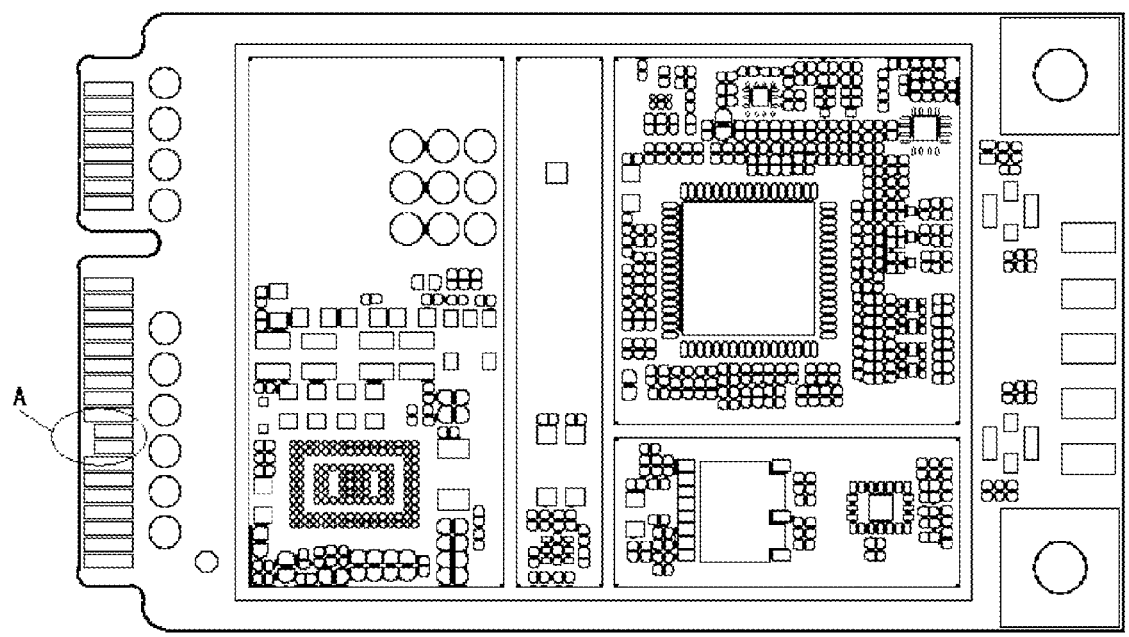
FIG. 3 depicts a PCB diagram of a communication module for implementing a hot plug according to the present invention.

With further reference to FIG. 2 and FIG. 3, because a USB data pin D− and/or a USB data pin D+ of a new-generation Mini-PCIe interface may be shorter than other pins, such as the power source pin $V_{BUS}$, when an associated communication module is plugged into a corresponding host system, i.e., a plug is inserted into a socket, the power source pin $V_{BUS}$, of the new-generation Mini-PCIe interface of the communication module, may be connected to the power source pin $V_{BUS}$ on the socket of the host system before the data pins, such that the system may be powered on and may start working. Subsequent to connection of the power source pin $V_{BUS}$, the USB data pin D− and/or the USB data pin D+, of the new-generation Mini-PCIe interface, may be separately connected to the USB data pin D− and/or the USB data pin D+ on the host system, such that USB communication may be initiated after connection of the power source pin $V_{BUS}$. Thereby, a central processing unit (CPU) in the host system can power up the communication module in advance of connection of the data pins, and may prepare for transmission of USB data after the system is stable.

When the communication module is unplugged from the host, the USB data pin D− and/or the USB data pin D+, of the new-generation Mini-PCIe interface, may be first disconnected from the USB data pin D− and/or the USB data pin D+ of the host system, i.e., USB data transmission may be disconnected before disconnection of the power source pin $V_{BUS}$. Thereby, the CPU can process a disconnection event of the USB and may store relevant data prior to disconnection of the power source pin $V_{BUS}$. Thereafter, the power source pin $V_{BUS}$, of the communication module, may be disconnected from the power source pin $V_{BUS}$ of the host system, and the communication module may be powered off.

Figure 4:
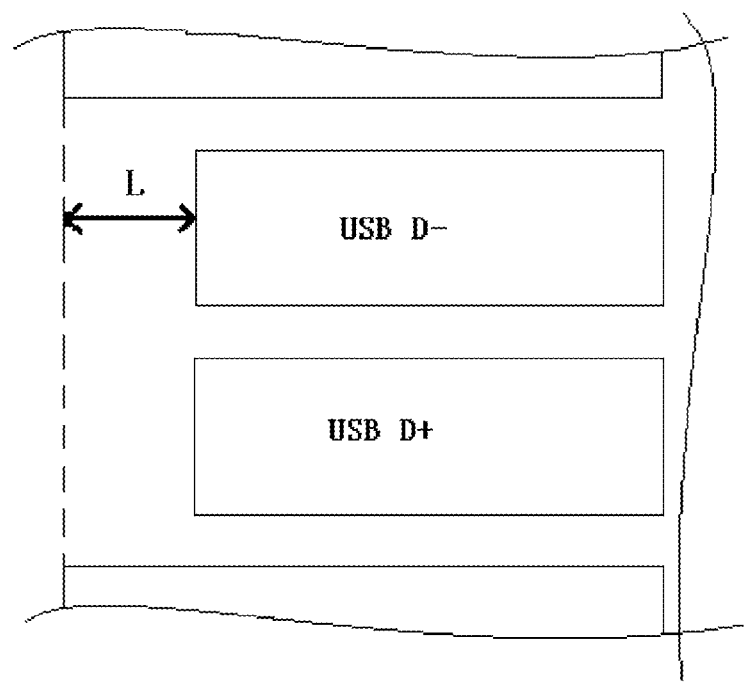
FIG. 4 depicts an enlarged schematic diagram of a part A, in the PCB diagram of FIG. 3, of a communication module for implementing a hot plug according to the present invention.

A length of a USB data pin D− and/or a USB data pin D+, of the new-generation Mini-PCIe interface, may be shorter than a length of other pins, of the new-generation Mini-PCIe interface, by 0.5 mm, as indicated by the length L shown in FIG. 4. According to different plugging and unplugging speeds, disconnection of, of the new-generation Mini-PCIe interface, power source pin $V_{BUS}$ may lag behind disconnection of a USB data pin D− and/or a USB data pin D+ by about hundreds of milliseconds, i.e., after the USB data pin D− and/or the USB data pin D+ are disconnected, a time period of hundreds of milliseconds may exist before the disconnection of the power source pin $V_{BUS}$, and this time period may be enough for a CPU to process a USB disconnection event and store relevant data. Thereby, the CPU may store data and/or may stop data transmission before the communication module is powered off, and may data loss and/or storage failure that may be caused by simultaneous power-off and disconnection of data transmission. Thereby, integrity and correctness of data may be improved.

Figure 5:
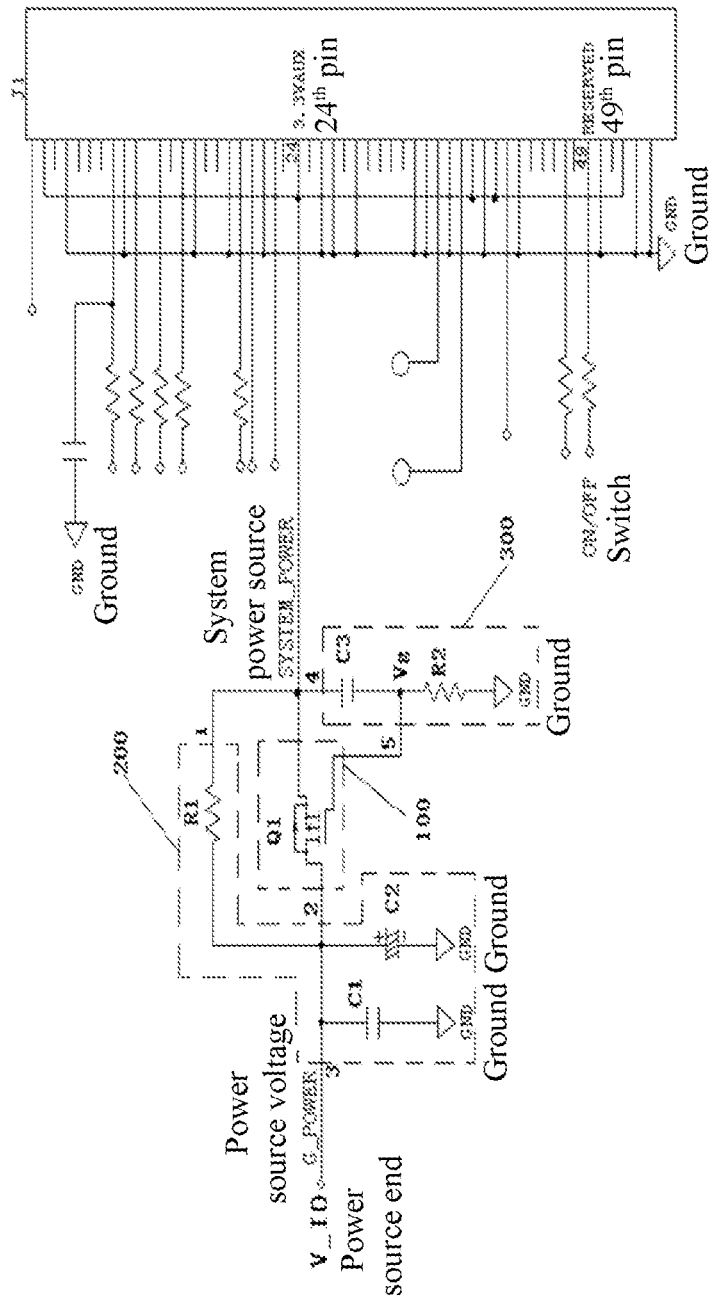
FIG. 5 depicts a schematic circuit diagram of a communication module for implementing a hot plug and a new-generation Mini-PCIe interface according to the present invention.

In order to avoid generation of a large transient current when a communication module is plugged into a power source interface, the communication module may control ON/OFF of a power switch 100 by using a charging unit 200 and a delay unit 300. Referring to FIG. 1 and FIG. 5, the power switch 100 may be configured to control connection and/or disconnection between a power supply end of a host system and a power source end V_IO of the communication module, e.g., an output end 3 of the charging unit 200. The power switch 100 may be an MOS field-effect transistor Q1. A source of the MOS field-effect transistor Q1 may be connected to, for example, a twenty-fourth pin (e.g., a $3.3V_{AUX}$ end) of a new-generation Mini-PCIe interface, a first input end 1 of a charging unit 200 and an input end 4 of a delay unit 300. A gate of the MOS field-effect transistor Q1 may be connected to an output end 5 of the delay unit 300. A drain of the MOS field-effect transistor Q1 may be connected to a second input end 2 of the charging unit 200. A system power source SYSTEM_POWER, provided by the power supply end of the host system, may be transmitted to a source of the MOS field-effect transistor Q1, the first input end 1 of the charging unit 200 and the input end 4 of the delay unit 300 through the twenty-fourth pin of the new-generation Mini-PCIe interface J1. The MOS field-effect transistor Q1 may be a PMOS transistor, and when a low level is input at a gate of the MOS field-effect transistor Q1, the MOS field-effect transistor Q1 may be on; and when a high level is input at the gate of the MOS field-effect transistor Q1, the MOS field-effect transistor Q1 may be off. FIG. 5 depicts pins and port names for a new-generation Mini-PCIe interface J1.

When the power switch 100 is turned off, i.e., the MOS field-effect transistor Q1 is off, the charging unit 200 may generate a charging current to raise a power source voltage of the communication module, such that a power source voltage G_POWER on a power source end V_IO of the communication module may rise from 0V to be close to, or equal to, a system power source SYSTEM_POWER of a host system. The charging unit 200 may include a first resistor R1, a first capacitor C1 and a second capacitor C2. A first end of the first resistor R1 may be connected to a source of the MOS field-effect transistor Q1, a twenty-fourth pin of a new-generation Mini-PCIe interface J1 and a input end of a delay unit 300. A second end of the first resistor R1 may be connected to a drain of the MOS field-effect transistor Q1, a first end of the first capacitor C1, a positive electrode of the second capacitor C2, and the power source end V_IO of the communication module. A second end of the first capacitor C1 and a negative electrode of the second capacitor C2 may both be grounded.

An intersection of the second end of the first resistor R1 with the drain of the MOS field-effect transistor Q1, the first end of the first capacitor C1 and the positive electrode of the second capacitor C2 may be the output end 3 of the charging unit 200, e.g., the power source end V_IO of the communication module. When the MOS field-effect transistor Q1 is off, the system power source SYSTEM_POWER may perform charging on the first capacitor C1 and the second capacitor C2 through the first resistor R1. A value of the charging current may be $(V_{\_SYSTEM\_POWER} - V_{\_G\_POWER})/R1$, where $V_{SYSTEM\_POWER}$ is a voltage value of the system power source SYSTEM_POWER, and $V_{\_G\_POWER}$ is a voltage value of the power source voltage G_POWER. The first capacitor C1 may be a filter capacitor, which may be configured to remove high frequency and/or impulse interference by means of filtering, and may have a capacitance of 100 pF. The second capacitor C2 may be a bulk capacitor, which may be configured to perform charging and/or control impulse power consumption within an adaptive range, and may have a capacitance of 150 μF.

A delay unit 300 may be configured to generate a predetermined delay, and after the predetermined delay expires, a power switch may be controlled to be turned on, such that a MOS field-effect transistor Q1 is on. The delay unit 300 may include a second resistor R2 and a third capacitor C3. A first end of the second resistor R2 may be connected to a gate of the MOS field-effect transistor Q1 A first end of the second resistor R2 may be further connected to a first end of a first resistor R1, and a source of the MOS field-effect transistor Q1 through the third capacitor C3. A second end of the second resistor R2 may be grounded. When a communication module is plugged in, a system power source SYSTEM_POWER may be transmitted to an input end 4 of a delay unit 300, i.e., a first end of a third capacitor C3. Based on characteristics of a capacitor, voltages at two ends of the third capacitor C3 may not change suddenly. For example, a voltage at a second end of the third capacitor C3 may be equal to the system power source SYSTEM_POWER, and a voltage Vg of the second resistor R2 may be equal to the system power source SYSTEM_POWER, which may be equivalent to a gate voltage and a source voltage of the MOS field-effect transistor Q1 being same, and the MOS field-effect transistor Q1 may be off. When both ends of the third capacitor C3 have equal voltages, no energy exists in the capacitor C3. Therefore, current from the voltage Vg may flow to ground through the second resistor R2, the voltage Vg may drop, and the third capacitor C3 may perform negative charging. Therefore, a voltage difference may occur between the two ends of the third capacitor C3, and energy may be generated. Before the voltage Vg drops to a switch threshold voltage that may turn on the MOS field-effect transistor Q1, the MOS field-effect transistor Q1 may maintain a cut-off state, and current flowing through the first resistor R1 may charge the second capacitor C2. When the voltage Vg drops to the switch threshold voltage, the MOS field-effect transistor Q1 may be on, and because an internal on-resistance of the MOS field-effect transistor Q1 may be small and can be ignored, the power source end V_IO of the communication module may be considered as being directly connected to the power supply end of the host system, i.e., the power source voltage G_POWER may be equal to the system power source SYSTEM_POWER, such that a working voltage for the communication module may be provided. A resistance of the second resistor R2 and a capacitance of the third capacitor C3 may be used to determine a delay constant t of the MOS field-effect transistor Q1, $t=R2 \times C3 \times \ln((V_{SYSTEM\_POWER} - V_{g1})/V_{SYSTEM\_POWER})$, where $V_{SYSTEM\_POWER}$ is the voltage value of the system power source SYSTEM_POWER, and $V_{g1}$ is the switch threshold voltage of the MOS field-effect transistor.

It should be noted that, a resistance of the first resistor R1, a resistance of the second resistor R2, a capacitance of the second capacitor C2, and a capacitance of the third capacitor C3 may be selected such that a first time constant determined by the first resistor R1 and the second capacitor C2 is less than a second time constant determined by the second resistor R2 and the third capacitor C3. In other words, after the second capacitor C2 is fully charged, and the power source voltage G_POWER of the communication module is close to, or equal to, the system power source SYSTEM_POWER, the third capacitor C3 may finish negative charging, i.e., Vg may drop to the switch threshold voltage. When a power source voltage G_POWER is close to, or equal to, the system power source SYSTEM_POWER, a current flowing from the system power source SYSTEM_POWER to the power source voltage G_POWER may be small, and the MOS field-effect transistor Q1 may be on, thereby, a large transient current that may otherwise be caused by the system power source SYSTEM_POWER having a certain voltage value may be transmitted to a 0V power source voltage G_POWER when the communication module is plugged in, may be avoided. Thereby, a transient current may have a small impact on the power switch 100, i.e., the MOS field-effect transistor Q1, and elements inside a power source module in the communication module will not be burnt out, such that influences on the power source of the communication module are reduced. Therefore, according to the resistance of the first resistor R1 and the capacitance of the second capacitor C2, a resistance of the second resistor R2 may be correspondingly set to 220 KΩ, and a capacitance of the third capacitor C3 may be correspondingly set to 1 µF.

In order to avoid a large transient current, that may be caused by a communication module immediately after being plugged in, a CPU of a host system may generate a control signal, after a MOS field-effect transistor Q1 is on, to turn on the communication module. The control signal may be output by a forty-ninth pin (e.g., a RESERVED end) of a new-generation Mini-PCIe interface J1, and may be transmitted to an ON/OFF control line ON/OFF of an ON/OFF control unit. When the communication module is in an OFF or a working state, a voltage at the ON/OFF control line ON/OFF may be at a high level by default, and the control signal may be a low-level impulse. When the communication module is in an OFF state, the control signal may convert the voltage at the ON/OFF control line ON/OFF into a low level, and the communication module may implement startup in response to the low level, the communication module may be started up, and may enter a working state. Because the low level only lasts a period of time, the voltage at the ON/OFF control line ON/OFF may be restored to a high level. Principles of shutting down a communication module may be performed in a similar manner. Because the control signal may be generated after the MOS field-effect transistor Q1 is on, the system may be stable, and current flowing from the system power source SYSTEM_POWER to the power source voltage G_POWER may be small, such that no large transient current occurs. Thereby, a transient drop in the power source voltage of the host system, which may otherwise be caused when the communication module starts working immediately after being plugged in, may be avoided and stability and reliability of the system may be improved.

A terminal, which may include a host system connected to a communication module. The host system may generate a control signal, after a power switch of the communication module is turned on, to turn on or off the communication module.

Referring to FIG. 1, FIG. 3 and FIG. 5, USB data pins, a power source interface and start-up of a 4G module are described separately. For example, the 4G module may be plugged into a mobile phone and a system power source SYSTEM_POWER may be equal to 5 V.

When the 4G module is plugged into the mobile phone, because a USB data pin D− and a USB data pin D+ on the 4G module may be shorter than other pins, a power source pin of the 4G module may be connected to a power source pin on a socket of the mobile phone before the data pins are connected before the USB data pins D− and the USB data pins D+ are connected. Thereby, a CPU in a host system may finish power-on and preparation before transmission of USB data begins. Thereby, transmission and/or processing of the USB data may occur after the system is stable to ensure correctness of the data.

After the 4G module is plugged in, the system power source SYSTEM_POWER of the host system may be transmitted to a source of the MOS field-effect transistor Q1 through the twenty-fourth pin of a new-generation Mini-PCIe interface J1, and voltages at two ends of a third capacitor C3 may be equal and may be, for example, 5V, i.e., a gate voltage and a source voltage of the MOS field-effect transistor Q1 may be equal and may be, for example, 5V. Therefore, the MOS field-effect transistor Q1 may be off. The system power source SYSTEM_POWER may perform small-current charging of a first capacitor C1 and a second capacitor C2 through a first resistor R1, and value of a voltage Vg may drop as a negative charging process of the third capacitor C3 proceeds. After the second capacitor C2 is fully charged, the power source voltage G_POWER of the communication module may be close to, or equal to, the system power source SYSTEM_POWER. Thereafter, the third capacitor C3 may finish a negative charging, and the voltage Vg may drop to a switch threshold voltage, such that the MOS field-effect transistor Q1 may be on. Because the power source voltage G_POWER may be close to, or equal to, the system power source SYSTEM_POWER, a current transmitted from the system power source SYSTEM_POWER to the power source voltage G_POWER may be small, i.e., an impact on the MOS field-effect transistor Q1 may be small. Thereby, the MOS field-effect transistor Q1 is off immediately after the 4G module is plugged in, and a large transient current, that may otherwise be generated when the 5V system power source SYSTEM_POWER is transmitted to a 0V power source voltage G_POWER, may be avoided. A large transient current may generate impact on, and thus may burn out, the MOS field-effect transistor Q1, and may affect the system power source.

After detecting that the MOS field-effect transistor Q1 is on, a CPU of the host system may generate a control signal and may output the control signal through a forty-ninth pin of a new-generation Mini-PCIe interface J1, and may transmit the control signal to an ON/OFF control line ON/OFF of the communication module to turn on the communication module. Because the system may be in a stable state after the MOS field-effect transistor Q1 is on, if the communication module is turned on at this time, a transient drop in the power source voltage of the host system can be avoided, thereby, stability and reliability of the system may be improved.

A communication module and a terminal for implementing a hot plug is provided. A length of USB data pins of a new-generation Mini-PCIe interface may be shorter than a length of other pins (including a power source pin) of the new-generation Mini-PCIe interface. During hot-plugging or hot-unplugging of the communication module, a host system may store USB data and/or may finish power-on preparation in advance before the device disconnects a USB or performs communication. Thereby, integrity and stability of data may be ensured. During hot plugging, the MOS field-effect transistor may be off, a second capacitor may be charged to raise a power source voltage of the communication module, and after the second capacitor is fully charged and the power source voltage of the communication module is close to, or equal to, the system power source, a third capacitor may finish negative charging, and may control the MOS field-effect transistor to be turned on, which may reduce impact of a transient current on the MOS field-effect transistor and may stabilize the system power source. The host system may output a control signal, after the MOS field-effect transistor is on, to turn on or off the communication module, thereby avoiding a transient drop in the power source voltage of the host system otherwise caused by a large transient current, and stability and reliability of the system may be improved.

Replacements and/or variations may be made according to the technical solution and inventive conceptions of the present disclosure, and all the variations and/or replacements should fall within the scope of the appended claims.

What is claimed is:

1. A communication module for implementing hot plug, comprising a new-generation Mini-Peripheral Component Interconnect Express (PCIe) interface configured to be connected to a host system, and further comprising:
   a power switch, configured to control connection and disconnection between a power source end of the communication module and a power supply end of the host system;
   a charging unit, configured to generate a charging current when the power switch is turned off, to raise a power source voltage of the power source end of the communication module;
   a delay unit, configured to generate a predetermined delay, and to control turning on of the power switch according to the predetermined delay; and
   an ON/OFF control unit, configured to control ON/OFF of the communication module according to a control signal output by the host system after the power switch is turned on,
   wherein the charging unit, the power switch, the delay unit and the ON/OFF control unit are separately connected to the new-generation Mini-PCIe interface, the power switch is connected to the charging unit, and the charging unit is connected to the power source end of the communication module; and
   wherein the length of a data pin of a universal serial bus (USB) of the new-generation Mini-PCIe interface is shorter than the length of a power source pin of the USB by a predetermined value, the predetermined value is ⅓ of the length of the power source pin, and the communication module is a third-generation (3G) module.

2. The communication module for implementing hot plug according to claim 1, wherein the power switch is a field-effect transistor; a source of the field-effect transistor is connected to a twenty-fourth pin of the new-generation Mini-PCIe interface, a first input end of the charging unit and an input end of the delay unit; a gate of the field-effect transistor is connected to an output end of the delay unit; and a drain of the field-effect transistor is connected to a second input end of the charging unit.

3. The communication module for implementing hot plug according to claim 2, wherein the charging unit comprises a first resistor, a first capacitor, and a second capacitor; a first end of the first resistor is connected to the source of the field-effect transistor, the twenty-fourth pin of the new-generation Mini-PCIe interface and the input end of the delay unit; a second end of the first resistor is connected to the drain of the field-effect transistor, a first end of the first capacitor, a positive electrode of the second capacitor and the power source end of the communication module; and a second end of the first capacitor and a negative electrode of the second capacitor are both grounded.

4. The communication module for implementing hot plug according to claim 3, wherein the resistance of the first resistor is 20 OMEGA, the capacitance of the first capacitor is 100 pF, and the capacitance of the second capacitor is 150 muF.

5. The communication module for implementing hot plug according to claim 3, wherein the delay unit comprises a second resistor and a third capacitor; a first end of the second resistor is connected to the gate of the field-effect transistor, the first end of the second resistor is further connected to the first end of the first resistor and the source of the field-effect transistor through the third capacitor, and a second end of the second resistor is grounded.

6. The communication module for implementing hot plug according to claim 5, wherein the resistance of the second resistor is 220 KOMEGA, and the capacitance of the third capacitor is 1 muF.

7. The communication module for implementing hot plug according to claim 5, wherein a first time constant determined by the first resistor and the second capacitor is less than a second time constant determined by the second resistor and the third capacitor.

8. A communication module for implementing hot plug, comprising a new-generation Mini-Peripheral Component Interconnect Express (PCIe) interface configured to be connected to a host system, and further comprising: a power switch, configured to control connection and disconnection between a power source end of the communication module and a power supply end of the host system; a charging unit, configured to generate a charging current when the power switch is turned off, to raise a power source voltage of the power source end of the communication module; a delay unit, configured to generate a predetermined delay, and to control turning on of the power switch according to the predetermined delay; and an ON/OFF control unit, configured to control ON/OFF of the communication module according to a control signal output by the host system after the power switch is turned on, wherein the charging unit, the power switch, the delay unit and the ON/OFF control unit are separately connected to the new-generation Mini-PCIe interface, the power switch is connected to the charging unit, and the charging unit is connected to the power source end of the communication module; wherein the length of a universal serial bus (USB) data pin of the new-generation Mini-PCIe interface is shorter than the length of a power source pin of the new-generation Mini-PCIe interface; and wherein the length of a date pin of a universal serial bus (USB) of the new-generation Mini-PCIe interface is shorter than the length of a power source pin of the USB by a predetermined value, the predetermined value is ⅓ of the length of the power source pin, and the communication module is a third-generation (3G) module.

9. The communication module for implementing a hot plug according to claim 8, wherein the power switch is a field-effect transistor; a source of the field-effect transistor is connected to twenty-fourth pin of the new-generation Mini-PCIe interface, a first input end of the charging unit and an input end of the delay unit; a gate of the field-effect transistor is connected to an output end of the delay unit; and a drain of the field-effect transistor is connected to a second input end of the charging unit.

10. The communication module for implementing hot plug according to claim 9, wherein the charging unit comprises a first resistor, a first capacitor and a second capacitor; a first end of the first resistor is connected to the source of the field-effect transistor, the twenty-fourth pin of the new-generation Mini-PCIe interface and the input end of the delay unit; a second end of the first resistor is connected to the drain of the field-effect transistor, a first end of the first capacitor, a positive electrode of the second capacitor and the power source end of the communication module; a second end of the first capacitor and a negative electrode of the second capacitor are both grounded.

11. The communication module for implementing hot plug according to claim 10, wherein the resistance of the first resistor is 20 OMEGA, the capacitance of the first capacitor is 100 pF, and the capacitance of the second capacitor is 150 muF.

12. The communication module for implementing hot plug according to claim 10, wherein the delay unit comprises a second resistor and a third capacitor; a first end of the second resistor is connected to the gate of the field-effect transistor, the first end of the second resistor is further connected to the first end of the first resistor and the source of the field-effect transistor through the third capacitor, and a second end of the second resistor is grounded.

13. The communication module for implementing hot plug according to claim 12, wherein the resistance of the second resistor is 220 KOMEGA, and the capacitance of the third capacitor is 1 muF.

14. The communication module for implementing hot plug according to claim 12, wherein a first time constant determined by the first resistor and the second capacitor is less than a second time constant determined by the second resistor and the third capacitor.

15. The communication module for implementing hot plug according to claim 8, wherein the communication module is a third-generation (3G) module or a fourth-generation (4G) module.

16. A terminal, comprising a host system and a communication module for implementing hot plug, wherein the host system is connected to the communication module; after a power switch of the communication module is turned on, the host system generates a control signal to control ON/OFF of the communication module the communication module comprising: a new-generation Mini-Peripheral Component Interconnect Express (PCIe) interface, configured to be connected to the host system; a power switch, configured to control connection and disconnection of a power source end of the communication module and a power supply end of the host system; a charging unit, configured to generate a charging current, when the power switch is turned off, to raise a power source voltage of the power source end of the communication module; a delay unit, configured to generate a predetermined delay, and control turning on of the power switch according to the predetermined delay; and an ON/OFF control unit, configured to control ON/OFF of the communication module according to a control signal output by the host system after the power switch is turned on, wherein the charging unit, the power switch, the delay unit and the ON/OFF control unit are separately connected to the new-generation Mini-PCIe interface, the power switch is connected to the charging unit, and the charging unit is connected to the power source end of the communication module; wherein the length of a universal serial bus (USB) data pin of the new-generation Mini-PCIe interface is shorter than the length of a power source pin of the new-generation Mini-PCIe interface; and wherein the length of a data pin of a universal serial bus (USB) of the new-generation Mini-PCIe interface is shorter than the length of a power source pin, and the communication module is a third-generation (3G) module.

17. The terminal for implementing hot plug according to claim 16, wherein the power switch is a field-effect transistor; a source of the field-effect transistor is connected to a twenty-fourth pin of the new-generation Mini-PCIe interface, a first input end of the charging unit and an input end of the delay unit; a gate of the field-effect transistor is connected to an output end of the delay unit; and a drain of the field-effect transistor is connected to a second input end of the charging unit.

18. The terminal for implementing hot plug according to claim 17, wherein the charging unit comprises a first resistor, a first capacitor and a second capacitor; a first end of the first resistor is connected to the source of the field-effect transistor, the twenty-fourth pin of the new-generation Mini-PCIe interface and the input end of the delay unit; a second end of the first resistor is connected to the drain of the field-effect transistor, a first end of the first capacitor, a positive electrode of the second capacitor and the power source end of the communication module; a second end of the first capacitor and a negative electrode of the second capacitor are both grounded.

* * * * *